March 14, 1933.  L. R. EVANS  1,900,922
GRIPPING FACE FOR CHUCKS AND METHOD OF MAKING THE SAME
Filed Sept. 23, 1930
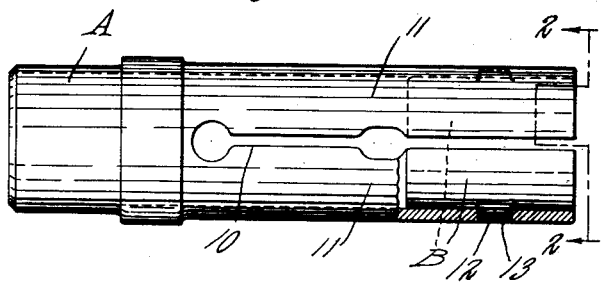
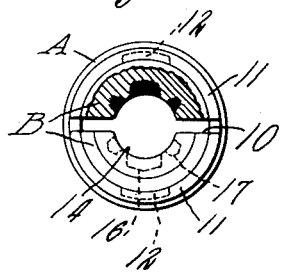
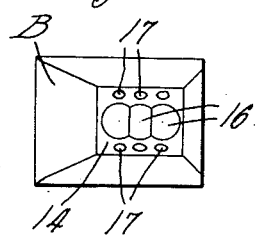
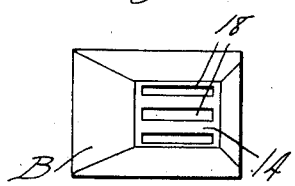
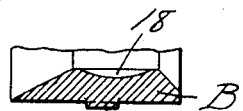
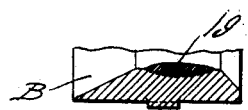
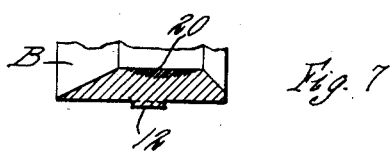
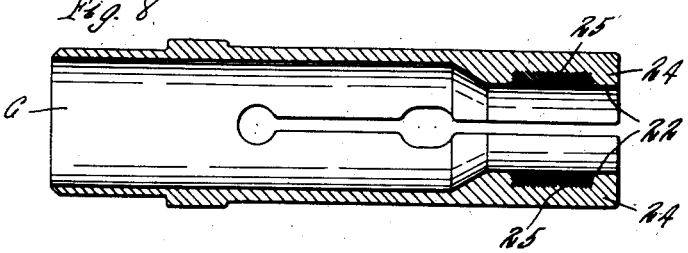
INVENTOR
Leigh R. Evans
by Parker & Crochnow
ATTORNEYS Patented Mar. 14, 1933

1,900,922

UNITED STATES PATENT OFFICE

LEIGH R. EVANS, OF ELMIRA, NEW YORK, ASSIGNOR TO MORRISON MACHINE PRODUCTS, INC., OF ELMIRA, NEW YORK

GRIPPING FACE FOR CHUCKS AND METHOD OF MAKING THE SAME

Application filed September 23, 1930. Serial No. 483,837.

This invention relates to improvements in chucks of the type commonly employed in connection with automatic screw machines for feeding and gripping the stock on which the machine is operating, and more particularly to the stock gripping faces of these chucks.

The objects of this invention are to improve the construction of stock engaging faces of chucks of this kind so as to materially improve their resistance to wear; also to provide a process of making the gripping faces of chucks of this kind; also to improve the construction of and method of making the gripping faces of chucks of this kind in other respects hereinafter specified.

In the accompanying drawing:

Fig. 1 is a longitudinal view, partly in section, of a chuck having stock gripping pads provided with wear-resisting faces embodying this invention;

Fig. 2 is an end view thereof, partly in section, on line 2—2, Fig. 1;

Figs. 3 and 4 are face views of a gripping pad for a chuck, removed from the chuck, and showing different forms of stock gripping faces;

Fig. 5 is a sectional view of a pad, showing the same before the wear-resisting material is applied thereto;

Fig. 6 is a similar section showing the pad after the wear-resisting material has been applied;

Fig. 7 is a similar section after the gripping surface has been finished;

Fig. 8 is a longitudinal section of a feed chuck of different construction having work gripping faces embodying this invention applied thereto.

Two types of chucks are commonly employed in connection with screw machines, one chuck being provided with spring members formed to yieldingly grip the stock, this chuck being commonly referred to as a feed finger. The other type of chuck has its spring members formed to normally disengage the stock, the members being pressed against the stock by suitable means for clamping the stock while the machine is working thereon, this type of chuck being commonly called a collet. This invention is applicable to both types of chucks and to any other chucks having gripping faces which are subject to wear. The wear upon the gripping faces of feed fingers is very great, since after each forward feeding movement, the gripping faces of the feed fingers, while yieldingly pressed against the stock, are dragged along the face of the stock into position for the next feeding operation, and consequently, the life of the feed fingers or of the wearing pads, if such are used, is generally comparatively short. The collets, of course, are also subject to somewhat similar wear, and the replacing of either a feed finger or a collet in a screw machine necessitates the shutting down of the machine for a period of time sufficient to permit the removing and replacing of the worn out part, and thus adds to the cost of producing the work, so that a material saving in this cost can be made by lengthening the life of the wearing faces of these chucks.

Figs. 1 to 7 illustrate the manner of applying my invention to a feed finger of a certain type having removable wearing pads, and Fig. 8 shows the invention applied to a feed finger with integral wearing faces.

Referring to Figs. 1 and 2, A represents a chuck adapted to be placed in a machine, and the stock to be fed (not shown) extends lengthwise through the interior of the chuck. The chuck is slotted as indicated at 10, thus forming between the slots, spring members which normally act of their own resilience to engage the stock.

In the particular construction illustrated, a chuck is shown, which is intended to cooperate with stock gripping pads B, which are normally pressed toward the stock by the spring action of the chuck, the spring members 11 of the chuck being shown separated in the construction illustrated, which positions they would occupy when engaging the stock. The pads in the construction shown are provided at their outer surfaces with projections 12, which are adapted to enter into recesses 13 formed in the spring members 11 of the chuck for holding the pads in their operative positions. The chuck as well as the pads may be of any suitable or usual construction, and of themselves do not constitute a part of this invention.

In order to increase the resistance to wear of the stock engaging faces 14 of the pads, portions of these surfaces of the pads are formed of suitable materials or alloys of an extremely hard nature. Materials of this kind are well known, and any desired material of this kind may be employed. Examples of such materials are tungsten carbide and a material known as "Stellite".

In order to apply these materials to the stock engaging faces of the pads, the pads are first provided in their stock engaging faces with recesses or depressions into which small quantities of these hard materials or alloys may be welded. For example in Figs. 2 and 3, depressions 16 and 17 are drilled into the stock engaging face of the pad. In Fig. 4, shallow, longitudinal recesses 18 are cut into the stock engaging face 14 of the pad. It will be obvious that numerous other forms of depressions may be employed in place of the two illustrated.

The portions of the pads of the chuck at and immediately adjacent to the depressions are then heated to a welding temperature by suitable means, such as an oxy-acetylene torch, by means of which the hard metallic substance is also welded into the recesses or depressions in the stock engaging faces. This is preferably done by fusing portions of the hard metallic substance and dropping the fused substance into the depressions, whereupon it becomes welded to the metal of the pads. If desired, the material may be fused and dropped into the depressions and welded to the pads by electrical means. The depressions thus act to retain the fused substance in the desired places in the stock engaging faces. The pads will then have their recesses filled as indicated at 19 in Fig. 6, and some of the excess material will extend above the level of the recesses. The pads are then subjected to a grinding operation in the usual manner to finish the stock engaging faces 14, and at the same time remove the excess of the hard material, thus producing a smooth work engaging surface having hard spots or portions 20 therein, as illustrated in Fig. 7, the upper surfaces of which are flush with the other surfaces of the pads. Means other than grinding may, of course, be used for finishing the stock engaging faces of the pads.

The invention may also be applied to chucks, in which the gripping faces are formed integral therewith, as in the construction illustrated in Fig. 8, in which C represents the chuck having stock gripping portions 22 formed on the ends of the resilient members 24 thereof, and spots or small surfaces of the hardened material may be formed at intervals on these faces, as indicated at 25, the hard material being welded into recesses or work engaging faces, and then the excess of hard material is ground off as described in connection with the pads B used in the construction illustrated in Figs. 1 to 7.

The construction described has the advantage that the hardened portions of the stock engaging faces of the chucks will offer a very materially greater resistance to wear than other portions of the chucks or pads, and will thus also prevent the stock from wearing away the softer portions of the chucks or pads. Since the hard substances are confined in depressions or recesses in the faces of the stock gripping parts, these substances are securely confined in these recesses and are protected against breakage or chipping by the metal of the chuck or pad. The process and construction described also has the advantage that the hard wear-resisting material, which has a considerably higher melting point than steel, is applied to the stock engaging faces only at intervals so that only relatively small portions of the chucks or pads are heated to the high temperature necessary to effect welding of the hard alloys to the steel. This prevents the formation of excessive scale on the chucks or pads, and other damage which might result if the entire stock engaging faces of the chucks or pads were raised to the temperature necessary for welding the hard material thereto, such, for example, as distortion of the pads or chucks due to excessive heat.

While the drawing illustrates chucks adapted to operate on stock of circular cross section, it will be obvious that this invention is equally applicable to chucks or pads for use in connection with stock of other cross section.

I claim as my invention:

1. A chuck having a stock engaging face provided with wear-resisting portions, in which a shallow recess is formed in said face, and an insert of a hard, brittle metallic material having relatively low tensile strength welded in said recess to the metal of said chuck, with the metal of the chuck forming a reinforcement on all sides except the face of the insert.

2. A chuck having a stock engaging face provided at intervals in said face with wear-resisting portions, said stock engaging face being provided with recesses formed at intervals in said face, and having inserts of a hard, brittle metallic substance of low tensile strength welded in said recesses to the metal of said chuck, with the metal of said chuck forming a reinforcement on all sides of each of the several inserts except the faces of the inserts.

3. A chuck having spring members, stock engaging pads secured to said spring members and having stock engaging faces provided with wear resisting portions, said pads having shallow recesses formed in said faces, and inserts of a hard, brittle metallic material of low tensile strength welded in said recesses to the metal of said pads, the metal of the pads forming a reinforcement on all sides of said inserts except the faces thereof.

LEIGH R. EVANS.